United States Patent [19]

Jensen

[11] 4,216,981
[45] Aug. 12, 1980

[54] CONNECTING LENGTHS OF TUBING

[75] Inventor: Tor A. Jensen, Bösingen, Switzerland

[73] Assignee: Spiro Investment S.A., Bösingen, Switzerland

[21] Appl. No.: 929,986

[22] Filed: Aug. 1, 1978

[30] Foreign Application Priority Data

Aug. 5, 1977 [GB] United Kingdom ............... 33023/77

[51] Int. Cl.² ............................................. F16L 17/00
[52] U.S. Cl. ..................................... 285/97; 285/110; 285/231; 285/345; 285/347; 285/370
[58] Field of Search ................. 285/97, 110, 109, 230, 285/231, 345, 347, 370; 277/34, 34.3

[56] References Cited

U.S. PATENT DOCUMENTS

| 2,314,386 | 3/1943 | Brend | 285/347 X |
| 2,816,575 | 12/1959 | Stokes | 277/34 X |
| 2,822,192 | 2/1958 | Beatty | 277/34.3 X |
| 3,258,271 | 6/1966 | Hollingsworth | 277/34.3 X |
| 3,821,340 | 6/1974 | Marks | 277/34 |
| 3,955,834 | 5/1976 | Ahlrot | 285/110 |

FOREIGN PATENT DOCUMENTS

| 2156713 | 5/1973 | Fed. Rep. of Germany | 285/370 |
| 849454 | 8/1939 | France | 285/97 |
| 494402 | 10/1938 | United Kingdom | 277/34.3 |
| 1077314 | 7/1967 | United Kingdom | 285/97 |

Primary Examiner—Dave W. Arola
Attorney, Agent, or Firm—Spencer & Kaye

[57] ABSTRACT

A connector for connecting lengths of metal tubing such as used for air-conditioning or central heating ducts, comprises a cylindrical end part for insertion into an open end of the tubing. In order to provide a seal between the connector and the tubing the connector has a recess containing a hollow, flexible sealing ring into which fluid can be injected to expand the ring. In order to ensure an adequate seal both before and after expansion of the sealing ring the latter has outwardly projecting sealing flanges which, before expansion of the sealing ring, make a seal due to their own inherent resilience and/or the resilience of the sealing ring, and, after expansion of the sealing ring, form a seal under compression. In one embodiment of the connector a sealing flange is adapted to fold over and lie between the respective faces of the connector and the tubing to prevent metal to metal contact between them.

4 Claims, 10 Drawing Figures

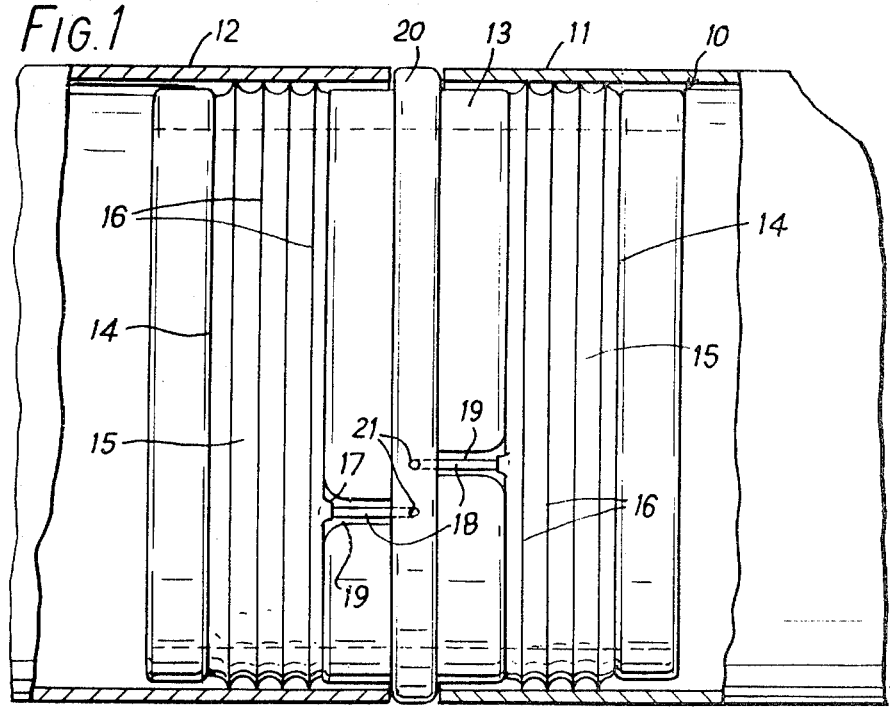
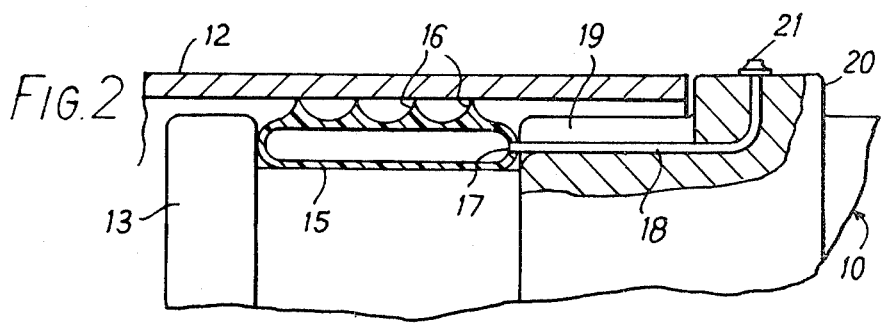
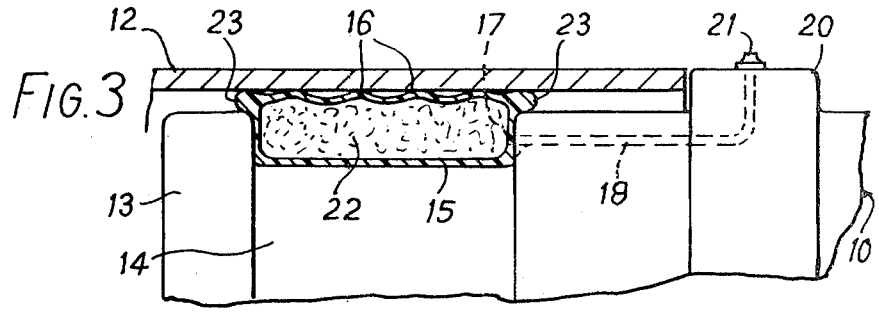

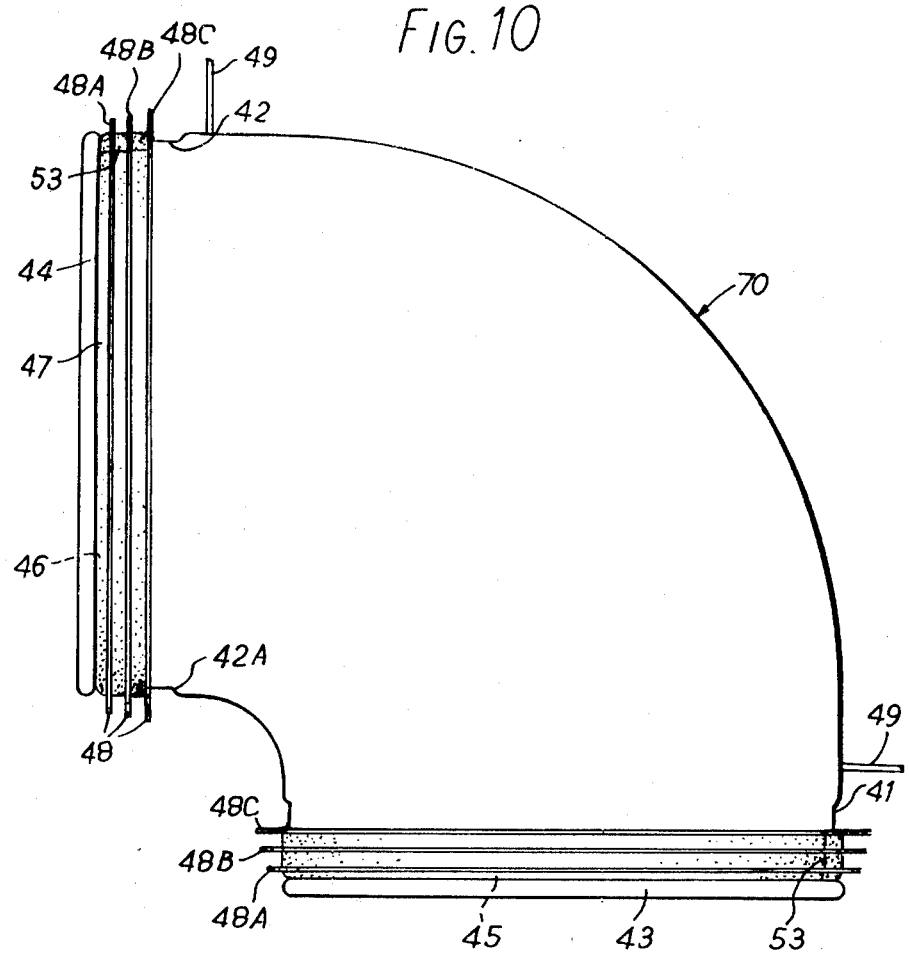

CONNECTING LENGTHS OF TUBING

BACKGROUND OF THE INVENTION

This invention relates to connectors for use in connecting lengths of tubing.

Lengths of tubing, such as spiral lock-seam metal tubing marketed under our Trade Mark SPIRO, are usually inter-connected on site by connectors such as sleeve couplings, T-couplings, taper couplings or bend-couplings, and difficulties can arise in readily obtaining satisfactory sealing at the points of connection. This also applies to end closures.

A further disadvantage of known connectors utilized for connecting lengths of metal tubing as used, for example, in central heating or air conditioning ducts is that for stable connection a metal to metal contact is required between the ducting and the connector. This can lead to undesirable noise in the system due to the transmission of vibration along the ducting via the metal to metal contact.

SUMMARY OF THE INVENTION

It is accordingly an object of the invention to provide an improved connector for metal tubing, which facilitates satisfactory sealing of the joint. It is a further object to provide a connector which is capable of providing a stable connection without metal to metal contact.

According to the present invention there is provided a connector having a cylindrical end part for connection to an open end of a length of tubing, the connector being formed around its end part with a recess in which a sealing member is accommodated, the sealing member comprising a hollow flexible ring into which fluid can be injected to expand the ring and annular flanges extending outwardly from the ring to engage the inner face of the tubing and be urged into close engagement with said face on expansion of the ring.

Suitably, said fluid is a liquid which will change to an effectively permanent solid state in a relatively short period of time.

When in the form of a sleeve coupling, the connector will have two sealing members, one in a recess at each of the two end parts.

Preferably, said flanges are integral with the hollow flexible ring and comprise an axially-spaces series which increase in radial height from the leading flange to the trailing flange. The leading and trailing flanges are, respectively, the first and last flanges to enter said length of tubing on insertion of the connector.

BRIEF DESCRIPTION OF THE DRAWINGS

FIG. 1 is a plan view showing one connector according to the invention, in the form of a sleeve coupling, interconnecting two lengths of metal tubing which are partly broken away;

FIG. 2 is a detail section showing a sealing member of the connector;

FIG. 3 corresponds to FIG. 2, but shows the sealing member in an expanded condition;

DETAILED DESCRIPTION OF PREFERRED EMBODIMENT

Figure 4:
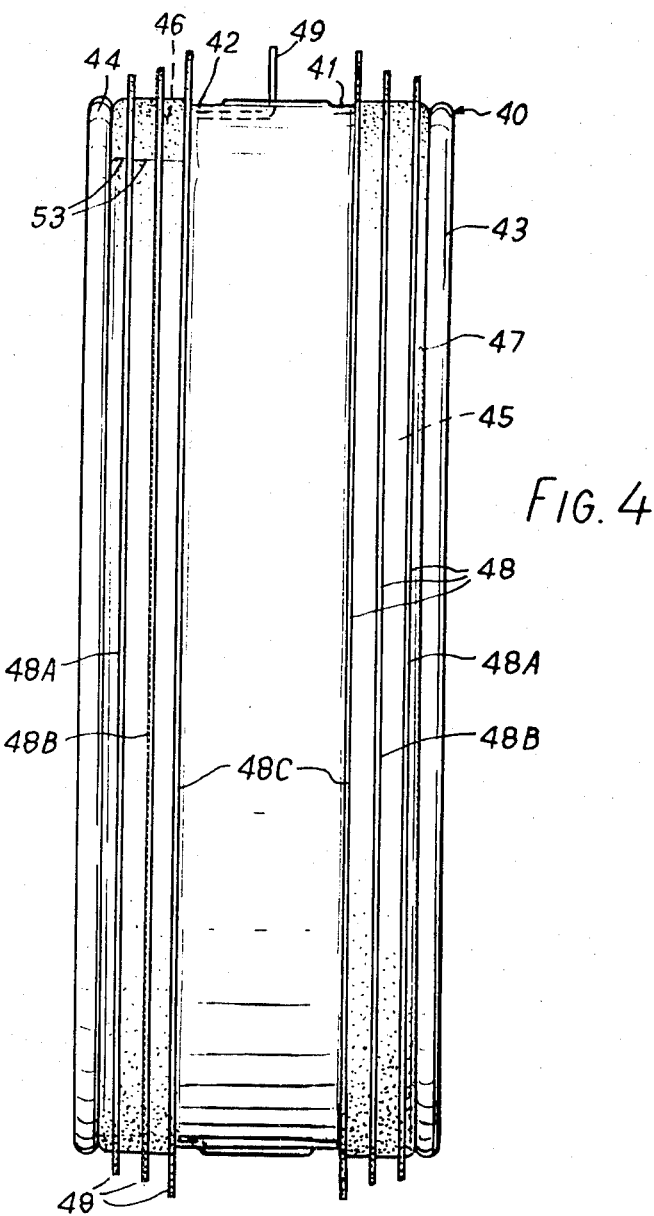
FIG. 4 is a side view of another connector according to the invention.

Referring to FIGS. 1 to 3 of the drawings, connector 10 is arranged to interconnect lengths 11 and 12 of metal tubing which may be of the spiral lock-seam type. The connector comprises an internal sleeve 13 of cylindrical form and recesses 14 are formed around each end part of the sleeve.

In each recess 14 is accommodated a sealing member 15 which comprises a hollow ring of rubber or flexible plastics material. The sealing member 15 is formed with rib-like flanges 16 around its outer face, and with a side opening 17 which connects with a pipe 18. The pipe 18 is suitably formed of metal and extends from the opening 17, through groove 19 and central collar 20 of the sleeve 13, to an inlet nozzle or valve 21.

In use of the connector, one end of the sleeve 13, with its sealing ring in the unexpanded state shown in FIG. 2, is inserted into the open end of tubing length 12 until the collar 20 engages the mouth of the tubing. The length 11 of tubing is then passed over the other end of the sleeve, with its sealing ring in a similar state, until the mouth of length 13 engages collar 20. In this position, the flanges 16 are in engagement with the inner faces of the tubing lengths and serve to provide an initial seal due to their inherent resilience. A suitable plastics material 22, possibly a freshly prepared mixture of an epoxy resin and a hardener, is then injected through nozzles 21 to enter the hollow rings in liquid form and expand the ribs 16 into tight sealing engagement with the inner faces of tubing lengths 11 and 12, so that the sealing effect of the ribs 16 is increased by placing them under compression. The sealing rings are, of course, also urged into tighter sealing contact with the recesses 14, and it will further be noted that the sides of the sealing rings expand, as indicated at 23, into the annular gaps between the sleeve and the tubing. Owing to the axial length of the seal and the firm engagement of the sides of the seal with the tubing it will be seen that a stable connection is achieved without metal to metal contact between the tubing and the connector. The injection pressure is then maintained or the nozzles sealed, possibly automatically if valves are incorporated, until the material 22 solidifies to provide a more or less permanent seal between the sleeve and the lengths of tubing.

In a modification, the material 14 may be injected into the rings by means of a hypodermic-type needle, and openings may be provided for escape of air from the interior of the rings.

Referring now to FIGS. 4 to 9, connector 40 is arranged to connect lengths 11 and 12 of metal tubing. The connector is formed as a circular-section sleeve with a pair of inwardly angled end flanges 43, 44, a pair of annular recesses 45, 46 near the end flanges, and a pair of shallower recesses 41, 42 adjacent the recesses 45, 46 on the sides thereof remote from the adjacent ends of the connector 40.

In each recess 45, 46 is accommodated a sealing member 47 which comprises a hollow ring of rubber or flexible plastics material. The sealing ring is formed with a series of three flanges 48 which, as shown in FIG. 4 extend radially outwardly and form a series which increase in radial height from the leading flange 48A to the trailing flange 48C. The flanges 48 are of constant thickness and the thickness of the flange 48C is approximately twice the depth of the recess 41 or 42 for the purpose to be described below. A narrow-bore pipe 49 of relatively soft metal such as brass extends into each sealing ring and localised depressions 50 and 51 are formed in the connector body to accommodate the horizontal runs of the two pipes.

Figure 5:
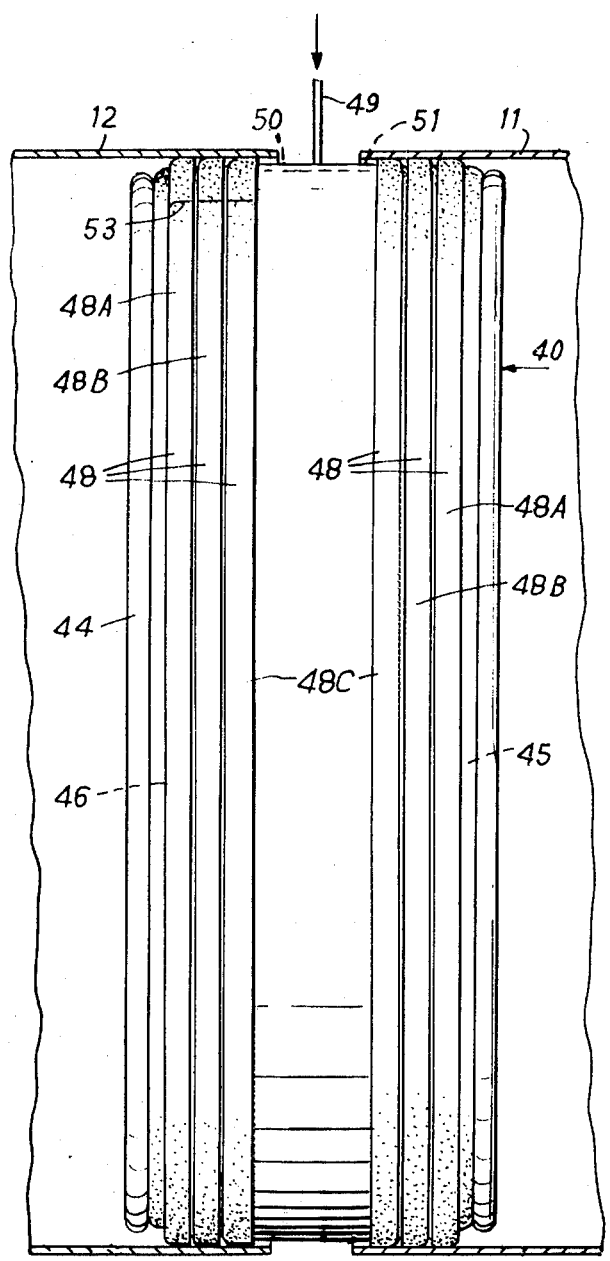
FIG. 5 is a side view of the connector shown in FIG. 4, when inserted into two lengths of metal tubing.
Figure 6:
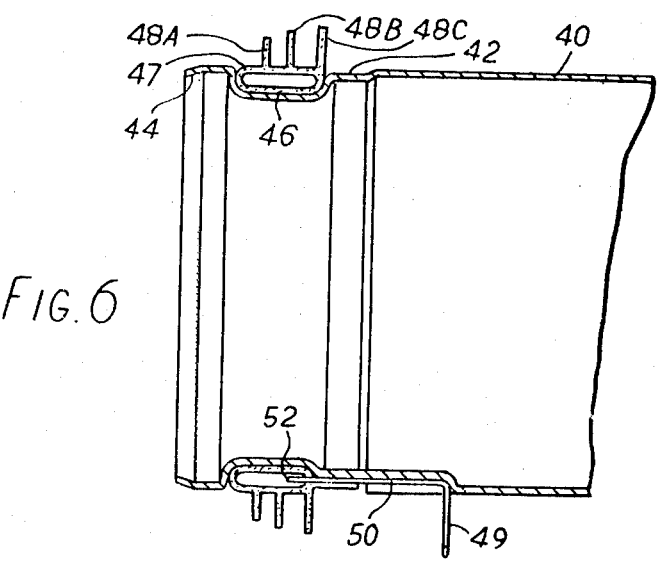
FIG. 6 is a detail section corresponding to FIG. 4, illustrating the sealing member of FIG. 4.

The ring-like sealing members 47 are formed as lengths of extruded strip, and then wound around the recesses 45, 46 and glued in position. Before the ends of each strip are secured together, a length of pipe 49 having a splayed end 52 is passed through the inner wall of the member 47; this is easily possible within a short distance from one or other of the ends of the strip. A strip end is indicated at 53 in FIGS. 4 and 5. The cross-section of the sealing ring when in place on the connector is indicated at FIG. 6.

Figure 7:
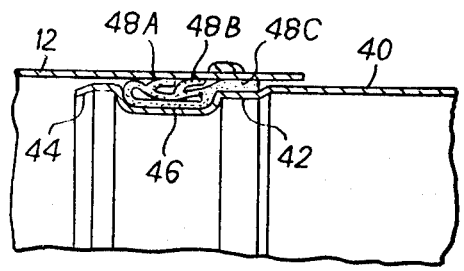
FIG. 7 is a similar view corresponding to FIG. 5.
Figure 8:
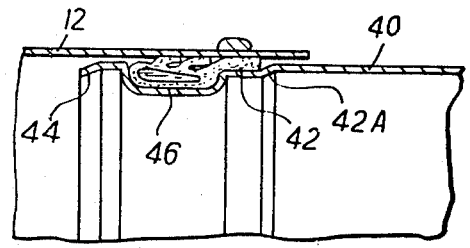
FIGS. 8 and 9 are detail sections corresponding to FIG. 7, but showing the sealing member during stages of expansion; and, FIG. 10 is a side view of a bend connector according to the invention.
Figure 9:
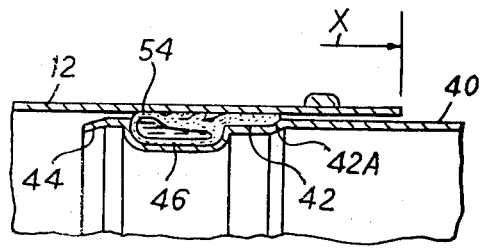

The connector 40 is then positioned in the end lengths of tubing 11 and 12. In this position, as illustrated in FIGS. 5 and 7, the flanges 48 are bent over against the inner faces of the tubing to produce quite satisfactory sealing. It will be noted that the bent-over flanges 48A and 48B lie in the spaces which exist between the seaing rings and the tubing and thus provide a seal due to their inherent resilience. The flanges 48C are bent over to lie in the recesses 41, 42 and by engaging between the latter and the tubing, they serve to locate the connector accurately within the tubing to avoid metal to metal contact. It will be noted that since the recesses 41, 42 have a depth equal to only half the thickness of the flanges 48C the latter project above the outer circumference of the connector 40 by a radial distance equal to half their thickness and the inner wall of the tubing is correspondingly dimensioned to fit over the sealing ring. To increase the degree of sealing, and also to lock the connector in position, a setting medium such as an expanding polyurethane composition is injected into the partly collapsed sealing member which are thus expanded to urge the flanges 48 into tight engagement with the tubing as shown in FIGS. 8 and 9. The outer ends of the pipes are then collapsed, for example by pliers, to seal the composition until it has set, whereupon the pipes might be trimmed or even extracted. By comparison of FIGS. 8 and 9 it will be seen that an added effect of the injection of setting medium is to cause axial movement of the connector into the tubing during expansion of the seal. This is due to the non-symmetrical arrangement of the flanges 48 on the sealing ring and the fact that the side of the sealing ring remote from the flanges 48 is able to expand by a greater amount thus not only compressing the flanges 48 but also urging them axially in the direction of the arrow X in FIG. 9, so that they carry the tubing with them. The seal also expands into contact with the tubing at point 54, thus forming a fourth axial ring of contact supplementing the three flanges 48. A further effect of the axial movement of flanges 48C is that they engage at their ends against inclined shoulders 41A, 42A of the recesses 41, 42 and since the length of the recesses 41, 42 is then insufficient to accommodate the flanges 48C the latter are compressed tightly against the walls of the tubing by the shoulders 41A, 42A thus further increasing the sealing effect and positively locking the connector 40 within the tubing. The requirement for additional fastenings, such as self-tapping screws, which would involve metal to metal contact and possible leakage, is thus avoided. Since the relative axial movement induced is quite significant it does have the added advantage of placing the ducting installation under tension, thus reducing possible slackness in the runs of ducting.

As indicated above, due to the inherent resilience of flanges 48 the connector 40 functions quite satisfactorily as a seal without the injection step, even if injection is overlooked or carried out incompetently.

FIG. 10 illustrates how a coupling embodying the characteristics and advantages of the present invention can be in the form of a 90° bend 70. In this Figure, parts corresponding to those in FIGS. 4 to 9 are marked with corresponding reference numerals.

The invention has been described as applied to internal sleeve couplings, but can also be adapted for use with external sleeve couplings or incorporated in, for example, taper couplings, T-couplings, saddle connections, or end closures.

I claim:

1. In a sealing assembly for providing a circumferential seal along an inner wall face of a tubing; the improvement comprising a sleeve arranged inside said tubing substantially coaxially therewith; means defining a circumferential recess in said sleeve; a sealing member including a hollow flexible ring seated in said circumferential recess substantially coaxially with said sleeve; said ring having, about its circumference, a plurality of axially spaced flexible annular flanges; said ring having a non-inflated state and an inflated state; in the inflated state fluid injected into said ring expands it radially outwardly for pressing said ring circumferentially against said inner wall face of said tubing; one of said annular flanges being a leading flange and another of said flanges being a trailing flange; said annular flanges increasing in height from said leading flange to said trailing flange; and means defining, adjacent said circumferential recess, an additional recess for accommodating the trailing flange when in engagement with and bent over by the tubing; the depth of said additional recess being less than the thickness of said trailing flange whereby said trailing flange maintains the tubing out of contact with said sleeve.

2. A sealing assembly as defined in claim 1, wherein said annular flanges are so dimensioned that, when bent over by engagement with tubing, the flanges lie in spaces between the sleeve and the tubing.

3. A sealing assembly as defined in claim 1, wherein said flanges are arranged non-symmetrically with respect to said ring, so that a leading end of the ring can expand to a greater extent than the remainder, during injection of fluid, for forcing the said flanges axially relatively to the sleeve.

4. A sealing assembly as defined in claim 3, wherein the said additional recess has an oblique shoulder at the axial end remote from the circumferential recess receiving the ring, the arrangement being such that upon axial movement of said trailing flange it is forced into engagement with the said oblique shoulder and compressed against the inner wall face of the tubing.

* * * * *